Feb. 25, 1964     M. LEWINSTEIN ETAL     3,122,732
AMPLITUDE DISTRIBUTION TELEMETERING
Filed Oct. 1, 1958
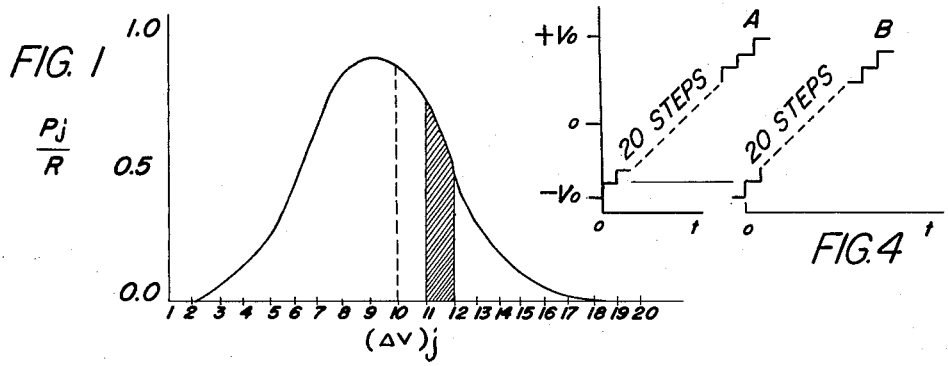
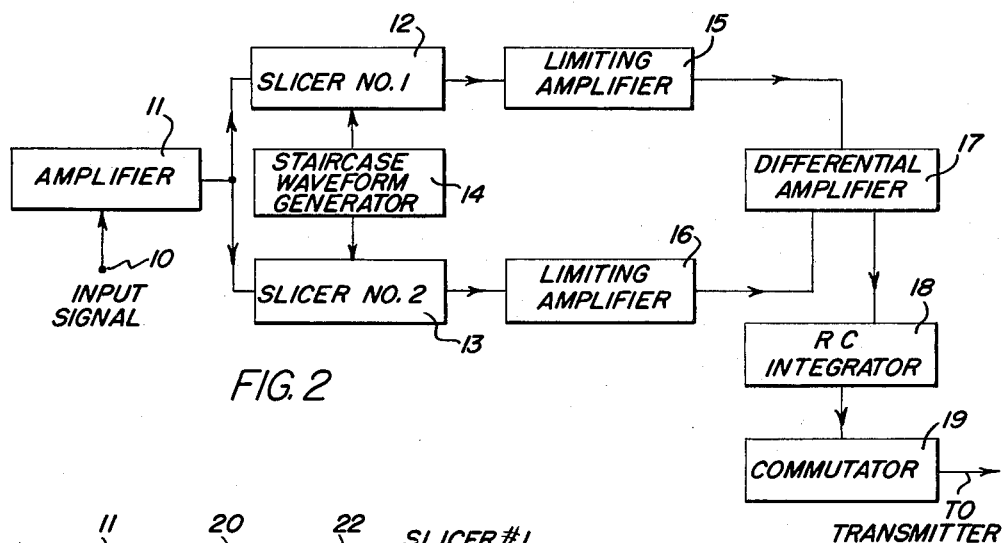
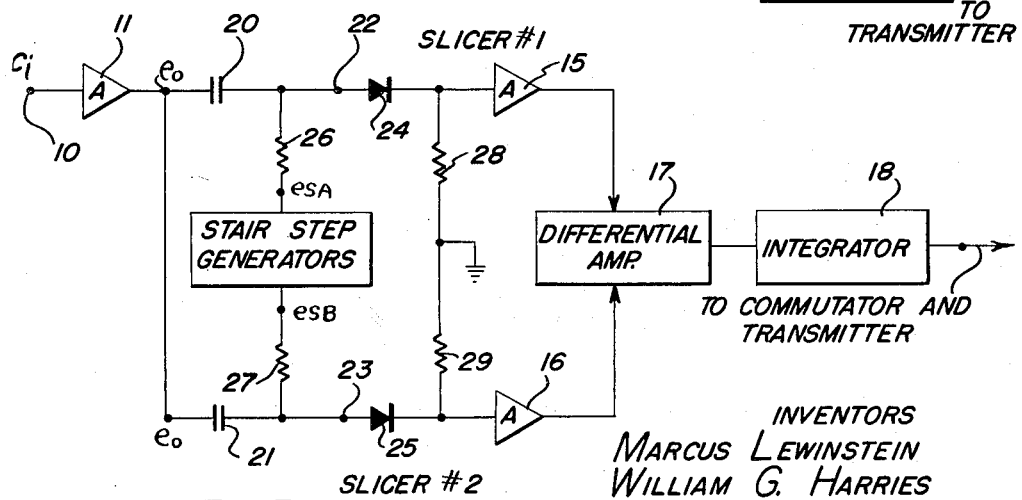
INVENTORS
MARCUS LEWINSTEIN
WILLIAM G. HARRIES
BY    *[signature]*
ATTORNEYS United States Patent Office 3,122,732
Patented Feb. 25, 1964

3,122,732
AMPLITUDE DISTRIBUTION TELEMETERING
Marcus Lewinstein, New York, N.Y., and William G. Harries, Creamridge, N.J., assignors, by mesne assignments, to Electro-Mechanical Research, Inc., Sarasota, Fla., a corporation of Connecticut
Filed Oct. 1, 1958, Ser. No. 764,568
10 Claims. (Cl. 340—345)

The present invention relates generally to systems of telemetering, and more particularly to systems of telemetering in which measured data is reduced at the measuring side to amplitude distribution functions, and the latter transmitted over a radio channel or link to a remote receiver.

Amplitude distribution functions, often called probability density functions, are well known in fields in which statistical techniques are applied. In the case of a typical transducer, the output signal is assumed to be a random function $V(t)$, which varies between $-V_0$ and $+V_0$ volts. This amplitude range is divided into N equal levels of magnitudes $\Delta V$. The amplitudes which fall into any one of the levels are integrated over a time T, and the process repeated for all the N levels. The numbers so obtained are divided by N, and the resultant numbers plotted as a function of voltage. The plot so obtained is an amplitude probability distribution.

A knowledge of amplitude probability distribution is useful in many applications. The following are typical:

(a) To determine the nature of a process reacting on a transducer to produce a signal.

(b) To calculate average value of a function.

(c) To study stresses on a missile member caused by disturbances, such as gusts.

(d) To determine saturation properties of control or servo systems.

(e) To determine whether a process is stationary in time.

Considered from a telemetering standpoint, the amplitude distribution function enables a characteristic of high frequency wide band data to be transmitted over a low frequency or narrow band-width link.

Processes of practical interest are stationary processes. Their amplitude probability distribution functions are independent of the choice of the time origin. Thus, they are time invariant. Based on this definition, it appears that the statistics of a stationary process can be determined by the examination of a single function for an infinite period instead of an ensemble of functions. Now if (1) $T$=total time range through which the time $t_1$ for signal value $V_1$ is swept, and (2) $\Delta T_1 (V_1, \Delta V_1; T)$ = the total time during which the signal at $t_1$ lies between $V_1$ and $V_1+\Delta V_1$ as $t_1$ moves through $T$, then amplitude probability distribution function of $V_1$ may be defined as $$P_1(V_1) = \lim_{\substack{T \to \infty \\ \Delta V_1 \to 0}} \frac{\Sigma \Delta T_1(V_1, \Delta V_1, T)}{T/\Delta V_1} \quad (1)$$

Now, the result of the limiting process is to make $P_1(V_1)$ time independent. The examination of a single function for an infinite time is an adequate method of determining the statistical properties of a stationary process, $V(t)$.

The system of the present invention will measure the probability that the signal voltage amplitudes "V" lie within the amplitude range $V_j<V<(V_j+\Delta V)$, where it was assumed that the signal amplitude range between $-V_0$ and $+V_0$ was divided into "$n$" equal slices or levels and wherein $V_j$ is a series of values of V identified by the index $j$ having the values $1, 2 \ldots n$. Hence, the probability of V being between $V_j$ and $V_j+\Delta V$ may be expressed as $$P(V_j<V<V_j+\Delta V) = P_1(V_1)\Delta V = P_j \quad (2)$$

for a stationary random process. Then the total probability $$P_0(V) = P(-V_0<V<V_0) = \sum_{j=1}^{j=n} P_j = 1 \quad (3)$$

and $$P_k(V) = P(-V_0<V<V_k) = \sum_{j=1}^{j=k} P_j \quad (4)$$

Although the function $V(t)$ under consideration is a continuous function, the distribution which will result from the measurement will be a discrete distribution because of the slicing technique used. It is assumed that, within the accuracy of the measurement, an approximation to a continuous distribution approximation results. Then $$P_j = \int_{V_j}^{V_j+\Delta V} P_1(V_1) dV \quad (5)$$

which may be used for all analytical work using this function.

The purpose of the slicing process is to set $\Delta V=R$ in Equation 2 where R is a constant. But, the range of $P_1(V_1)$ is $$0 \leq P_1(V_1) \leq 1 \quad (6)$$

where $P_1(V_1)=1$ corresponds to the fact that the amplitudes of $V(t)$ completely occupy the slice or level $V_j+\Delta V$ and $V_j$. Thus, $P_j$ can be normalized by dividing by R, with the result $$P_1(V_1) = \frac{P_j}{R} \quad (7)$$

Then the result of the measurement of $P_1(V_1)$ of the slice of $V_j+\Delta V$ and $V_j$ will be a number equal to $$\frac{P_j}{R}$$

A plot $$\frac{P_j}{R}$$

versus $(\Delta V)_j$ will be the amplitude probability distribution function, where $(\Delta V)_j$ corresponds to intervals $(V_j+\Delta V$ and $V_j)$. The cross hatched area $P_j$ under the probability distribution curve is equal to $$P_j = P\left(\frac{11R}{2V_0} < \frac{V}{2V_0} < \frac{12R}{2V_0}\right) \quad (8)$$

where R equals the width of the voltage slice, and $2V_0$ is the peak-to-peak voltage.

Briefly describing the invention, in a preferred embodiment, the output of a suitable transducer is first amplified to determine the resolution of the analyzer. The signal deriving from the amplifier is then fed into two slicers. Slicer No. 1 will pass only signals which lie within the interval $V_j+\Delta V$ and $V_j$, while Slicer No. 2 will pass only signals which lie in the interval $V(j+1)+\Delta V$ and $V(j+1)$. $\Delta V$ is the width of the level in volts. The output of each slicer is amplified and limited. In effect, the limiting threshold is $\delta V$ for the interval $V_j+\Delta V$ and $V_j$. Any signal amplitude that crosses the interval axis and finds itself in excess of $\delta V$ is treated as occupying the level. The output waveforms of Slicers No. 1 and No. 2 are then applied to a difference amplifier. Finally, the output of the difference amplifier is integrated for a time $T_s$ seconds by means of an RC integrator. The output of the integrator, which is a D.C. voltage, is proportional to the fraction of the period $T_s$ that the signal lies within the interval determined by Slicer No. 2.

Since the output of the integrator is a D.C. voltage, it can be sampled by a commutator. The period of one sample, $T_s$ seconds, multiplied by the number of slices determines the time required to analyze the signal for a full sweep. It is necessary that the signal remain statistically stationary during this time, and the choice of the sampling rate is dictated by this time.

It is, accordingly, a broad object of the present invention to provide a novel telemetering system, wherein amplitude probability functions are derived at a measuring site and transmitted via a radio link, whereby wide band signals may be transmitted in terms of slowly varying signals, and bandwidth conserved.

It is another object of the invention to provide a system for computing an amplitude probability distribution function, in response to a random input signal.

The above and still further objects, features and advantages of the present invention will become apparent upon consideration of the following detailed description of one specific embodiment thereof, especially when taken in conjunction with the accompanying drawings, wherein:

FIGURE 1 is a plot of a typical amplitude probability distribution;

FIGURE 2 is a block diagram of a system according to the invention;

FIGURE 3 is a schematic circuit diagram of a system according to FIGURE 2; and

FIGURE 4 represents two typical stair-step waveforms employed in the practice of the invention.

Referring now more particularly to the accompanying drawings, the reference numeral 10 denotes a signal input terminal. The signal is assumed to be derived from a transducer which is measuring a wide band high frequency random process. This signal is amplified in an amplifier 11, the output of the latter being applied in parallel to two slicers, No. 1 and No. 2, identified respectively by reference numerals 12 and 13. The latter are controlled in respect to slicing level jointly by a staircase waveform generator 14. The outputs of the slicers 12 and 13 are passed to limiting or saturating amplifiers 15, 16, respectively, so that the amplified outputs of the slicers 12, 13 are constant, i.e., or some predetermined value. The outputs of the limiting amplifiers 15 and 16 are combined in a differential amplifier 17, operating as an anti-coincidence circuit, and the output of the latter is integrated in an integrator 18, which in turn supplies signals to a commutator 19. The latter samples the output of the integrator at sufficiently frequent intervals to represent the signal, and the commutator output is applied to the transmitter of a radio link.

The function of the system of FIGURE 2 is to find the length of time the signal input at terminal 10 lies within the levels $(V_0-V_1)$, $(V_1-V_2)$, ... $(V_{j-1}-V_j)$ for a sampling period of $T_s$ seconds. The slicers 12 and 13 may be diodes which are biased by a staircase waveform to pass only signals exceeding the latter. The staircase voltages as applied to the two slicers differ always by $\Delta V$, which defines the slice width. The time that each slicer voltage is applied to a slicer is set equal to $T_s$, which is the reciprocal of the sampling frequency. One exemplary way of generating the required staircase voltages is by means of a stepping switch which samples the voltages at two adjacent taps of an N step voltage divider. Other expedients are also available in the art.

To provide a numerical example of the operation of the present invention, set $n=20$, then $\Delta V=0.5$ volt for $2V_0=10$ volts. The step scanning voltage, $e_s$, sweeps from negative to positive. At the start of a sweep, $e_s=5.0$ volts at Slicer No. 1 and $e_s=4.5$ volts at Slicer No. 2. Then, Slicer No. 1 will pass all signals whose amplitude exceeds $+5.0$ volts, assuming the slicers to be biased diodes.

Obviously, in this case no signals can lie in this interval because $+5.0$ volts is the maximum positive voltage, $+V_0$ of FIGURE 4, as indicated by the waveforms A and B thereon. But at Slicer No. 2, $e_s=+4.5$ volts. Then, all signals with magnitudes between $+5.0$ and $+4.5$ volts will occupy Slicer No. 2.

The outputs of each slicer are applied to an amplifier, as 15, 16. The signals that lie in each slice are amplified. The amplifiers are driven to saturation, thus defining the top boundary of the respective slicer, which is $\delta V$ volts. A value of $\delta V$ is the value which causes the amplifier to limit. Thus a threshold value for the slice is established. Any value in excess will cause the amplifier to limit.

After $T_s$ seconds, the slicers are advanced to the next level, i.e., $e_s=-4.5$ volts for Slicer No. 1 and $e_s=-4.0$ volts for Slicer No. 2. Consequently, all signals between 5.0 and 4.5 volts are found in Slicer No. 1, while all signals between 4.5 and 4.0 volts are found in Slicer No. 2. At $2T_s$ seconds, the slicers are advanced to the next level.

Reference is made to FIGURE 3 of the accompanying drawings, where is illustrated an exemplary circuit diagram of slicers employed in the present invention, and to FIGURE 4 which exemplifies typical stair-step waveforms.

In the system of FIGURE 3 an electrical signal representing a random time function is applied to terminal 10. The amplifier 11 amplifies the signal to a level suitable to enable attainment of the desired resolution, providing an output signal $e_0$. The signal $e_0$ is applied via condensers 20 and 21 to terminals 22, 23 of diodes 24, 25, respectively. A stair-step generator applies stair-step voltages, as indicated in the plot of FIGURE 4, to the terminals 22, and 23, via resistances 26 and 27, respectively. The waveform $e_{sA}$ is applied to slicer No. 1 and the waveform $e_{sB}$ to slicer No. 2.

The resistances 26 and 27 serve to subtract from the voltages $e_0$ the voltages $e_{sA}$ and $e_{sB}$, respectively, so that the total voltage applied to the terminals 22, 23 are $e_0-e_{sA}$ and $e_0-e_{sB}$.

The diodes 24 and 25 pass signal to load resistances 28, 29 so long as the net applied signal is positive. Hence, signal appears across load resistance 28 so long as $e_0$ exceeds $e_{sA}$, while signal appears across load resistance 29 so long as $e_0$ exceeds $e_{sB}$.

The voltages $e_0-e_{sA}$ and $e_0-e_{sB}$ derive from stair-step voltages which differ by $\Delta V$, i.e. $e_{sB}=e_{sA}-\Delta V$. However, the voltages appearing at the ungrounded terminals of resistances 28, 29 are applied to saturating or limiting amplifiers 15, 16 so that the extent to which $e_0$ exceeds $e_{sA}$ or $e_{sB}$ becomes of no consequence, and the outputs of amplifiers 15, 16 are applied to a differential amplifier 17.

In net then, so long as both diodes 24 and 25 conduct, then the output of the differential amplifier 17 is zero; but when only one diode 24 conducts, while the other diode 25 fails to conduct, is output signal present at the output terminal of differential amplifier 17. The latter then supplies an output signal to integrator 18 only while the amplitude of the signal $e_0$ falls between limits $V_j$ and $V_j+1=\Delta V$, the step interval of the stair-step waveforms, the latter also being equal to $e_{sB}-e_{sA}$. So long as the value of $e_0$ is less than $V_j$ no output derives from either of diodes 24, 25 and hence no output from differential amplifier 17, while so long as $e_0$ exceeds $V_j+1$, the equal outputs of amplifiers 15, 16 cancel in the differential amplifier 17.

The integrator 18 accordingly provides a signal, after a given time interval $T_{s1}$, which is proportional to the time during which $e_0$ was between $V_j$ and $V_j+1$. When time $T_{s1}$ is terminated, the limit value of the slice signals change to $V_{j-1}$ and $V_j$, assuming a descending stair-step, and the process above described is repeated for a further time interval $T_{s2}=T_{s1}$.

When the process described has been repeated for all amplitude intervals of interest, a complete amplitude probability distribution has been derived for the total time interval $T=nT_s$.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What we claim is:

1. A device for determining an amplitude distribution function of a random amplitude, time varying function, comprising a source of a random time function, means responsive to said random amplitude time varying function operative over successive amplitude, time varying intervals for measuring the fraction of each time interval for which the random time function exceeds $V_j$ without exceeding $V_j+\Delta V$, and means controlling said means for measuring for setting different values of $V_j$ for each of said time intervals wherein $V_j$ is a set of values of a variable voltage V which assumes a succession of different values for successive indices $j$, where $\Delta V$ is an increment of variation of V, and where $j$ is a variable index which varies over a range of values.

2. An amplitude probability distribution computer, comprising a source of a random amplitude, time varying function "$e$," means responsive to said function and operative over a succession of $j$ time intervals $T_s$ for generating first pulses of uniform amplitude, as $j$ assumes values 1, 2 ... $n$ during times when "$e$" exceeds $V_j$, where $V_j$ is an amplitude appropriate to $T_s$ for each $j$, means responsive to said function and operative over said succession of $j$ time intervals $T_s$ for generating second pulses of uniform amplitude during the times when "$e$" exceeds $V_j+\Delta V$, where $\Delta V$ is a relatively small voltage increment, means responsive to both said generating means for continuously obtaining the difference of said first and second pulses as further pulses of either zero or finite fixed amplitudes, and means responsive to said obtaining means for integrating said further pulses over each of the $j$ times $T_s$.

3. A telemetering transmitter comprising a source of electrical signals representing a random amplitude, time varying function of wide band character, means responsive to said source for converting said electrical signals to further electrical signals representative of an amplitude probability distribution function, and means responsive to said converting means for transmitting said further electrical signals to a remote location, said converter means comprising a first amplitude slicer responsive to said first mentioned electrical signals, a second amplitude slicer responsive to said first mentioned electrical signals, a source of step-voltage, means responsive to said step-voltage for controlling said first and second amplitude slicers to pass respectively amplitudes of said first mentioned electrical signals always differing by a small value, for a different average amplitude in response to each of the steps of said step function, means separately responsive to both said slicers for limiting the amplitudes of the responses of said slicers to a common predetermined value, whereby the outputs of said means for limiting are duration modulated pulses of fixed amplitudes, means responsive to said limiting means for obtaining the differences of the duration modulated pulses to generate further duration modulated pulses of fixed amplitude, and means responsive to said difference obtaining means for integrating said further duration modulated pulses.

4. An amplitude probability distribution analyzer for measuring the probability that an input signal will have an amplitude lying within a plurality of increments in a given period of time, comprising means responsive to said input signal for producing a prescribed signal only when the amplitude of said input signal lies within limits set by adjustable reference amplitudes, said limits being no more than a prescribed increment of amplitude, means controlling said producing means for adjusting said reference amplitudes as a function of time during said given period to sample said plurality of increments successively, and means responsive to said prescribed signal derived from said means for producing a prescribed signal for producing an output signal representing said probability.

5. An amplitude probability distribution analyzer for measuring the probability that an input signal will have an amplitude lying within a plurality of increments in a given period of time, comprising means responsive to said input signal for producing a prescribed constant signal only when the amplitude of said input signal lies within limits set by adjustable reference amplitudes, said limits being no more than a prescribed increment of amplitude, means controlling said producing means for adjusting said reference amplitudes in one direction as a function of time during said given period to sample said plurality of increments successively, and time averaging means responsive to said prescribed signal derived from said means for producing a prescribed signal for producing an output signal representing said probability.

6. An amplitude probability distribution analyzer for measuring the probability that an input signal will have an amplitude lying within a plurality of increments in a given period of time, comprising means responsive to said input signal for producing a prescribed constant signal only when the amplitude of said input signal lies within limits set by adjustable reference amplitudes, said limits being no more than a prescribed increment of amplitude, means controlling said producing means for adjusting said reference amplitudes in one direction as a prescribed function of time during said given period to sample said plurality of increments successively, and time averaging means responsive to said prescribed signal derived from said means for producing a prescribed signal for producing an output signal representing the time integral of said prescribed signal.

7. An amplitude probability distribution analyzer for measuring the probability that an input signal will have an amplitude lying within a plurality of increments in a given period of time, comprising means responsive to said input signal for producing a prescribed constant signal only when the amplitude of said input signal lies within limits set by adjustable reference amplitudes, said limits being no more than a prescribed increment of amplitude, means controlling said producing means for adjusting said reference amplitudes stepwise in one direction as a prescribed function of time during said given period to sample said plurality of increments successively, and time averaging means responsive to said prescribed signal derived from said means for producing a prescribed signal for producing an output signal representing the time integral of said prescribed signal.

8. An amplitude probability distribution analyzer for measuring the probability that an input signal will have an amplitude lying within a plurality of increments in a given period of time, comprising means responsive to said input signal for producing a prescribed constant signal only when the amplitude of said input signal lies within limits set by adjustable reference amplitudes, said limits being no more than a prescribed increment of amplitude, means controlling said producing means for periodically adjusting said reference amplitudes stepwise in one direction with a given stepping interval during said given period to sample said plurality of increments successively, and time averaging means responsive to said prescribed signal derived from said means for producing a prescribed signal for producing an output signal representing the time integral of said prescribed signal, said time averaging means having a time constant on the order of said stepping interval.

9. An amplitude probability distribution analyzer for measuring the probability that an input signal having frequency components within a given range will have an amplitude lying within a plurality of increments in a given period of time, comprising means responsive to said input signal for producing a prescribed signal only when the amplitude of said input signal lies within the limits set by adjustable reference amplitudes, said limits being no more than a prescribed increment of amplitude, means controlling said producing means for sweeping said reference amplitudes through the range of amplitudes of said input signal at a rate such that the amplitude distribution of said input signal during said sweeping period remains statistically stationary, thereby to sample said plurality of increments successively, and time averaging means responsive to said prescribed signal derived from said means for producing a prescribed signal for producing an output signal representing the amplitude probability distribution of said input signal during said given sampling period.

10. A device for determining an amplitude distribution function of a random amplitude time varying function comprising means responsive to said random time function for measuring the total time within a sampling period for which the amplitude of said random time function lies between narrow amplitude limits, said amplitude limits being discrete incremental steps, and means controlling said means for measuring for sequentially stepwise varying said amplitude limits while maintaining the difference between the limits substantially fixed.

References Cited in the file of this patent

UNITED STATES PATENTS

| | | |
|---|---|---|
| 2,477,395 | Sunstein | July 26, 1949 |
| 2,694,146 | Fairstein | Nov. 9, 1954 |
| 2,760,064 | Bell | Aug. 21, 1956 |
| 2,779,869 | Gerks | Jan. 29, 1957 |
| 2,820,895 | Johnstone | Jan. 21, 1958 |
| 2,837,642 | Schenk | June 3, 1958 |
| 2,947,971 | Glauberman | Aug. 2, 1960 |

OTHER REFERENCES

"Pulse Amplitude Analysis in Nuclear Research," by Van Rennes; Nucleonics, August 1952, pp. 22–28.